United States Patent [19]
Matsuda et al.

[11] Patent Number: 5,677,776
[45] Date of Patent: Oct. 14, 1997

[54] IMAGE READER FOR PROCESSING AN IMAGE OF A DOCUMENT

[75] Inventors: Shinya Matsuda, Kyoto; Shinichi Fujii, Amagasaki, both of Japan

[73] Assignee: Minolta Co., Ltd., Osaka, Japan

[21] Appl. No.: 534,266

[22] Filed: Sep. 26, 1995

[30] Foreign Application Priority Data

Sep. 29, 1994 [JP] Japan ................. 6-262066

[51] Int. Cl.$^6$ .............. H04N 1/38; H04N 1/04; G03B 27/32
[52] U.S. Cl. .......... 358/475; 358/463; 358/464; 355/25; 399/187; 399/362
[58] Field of Search ................. 358/475, 463, 358/464, 474, 450; 355/25; 399/187, 362

[56] References Cited

U.S. PATENT DOCUMENTS 5,084,611  1/1992  Okisu et al. ............... 250/208.1
5,377,019  12/1994  Okisu et al. ............... 358/464

Primary Examiner—Kim Vu
Assistant Examiner—Tia M. Harris
Attorney, Agent, or Firm—Sidley & Austin

[57] ABSTRACT

An image reader reads images from above a document platen upon which is placed a document such as a book or the like while using fingers or hands to press both edges of said document so as to prevent the pages of the document from rising upwardly, wherein the image reader determines the position of blank area in accordance with a background luminance, a character frequency of picture element, and position in subscan direction, and erases image data of blank area and its outside image data to erase image data of fingers or hands.

13 Claims, 15 Drawing Sheets

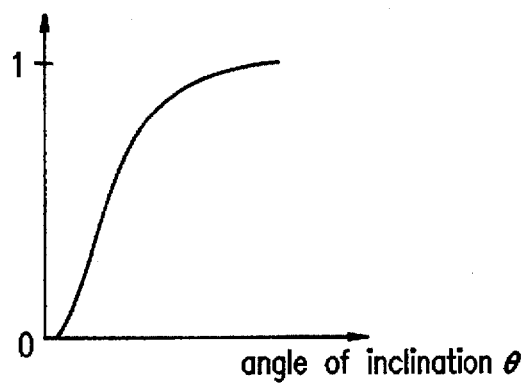
FIG. 22
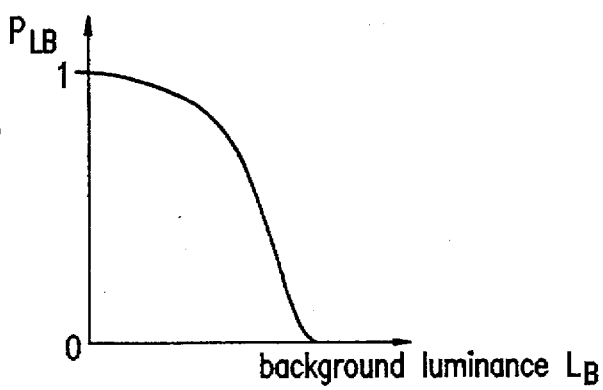
FIG. 23
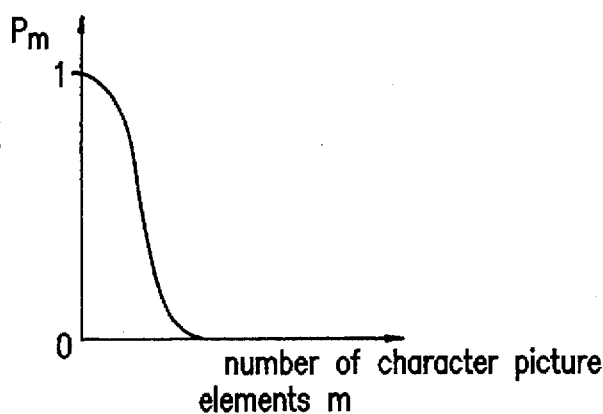
FIG. 24
FIG. 25
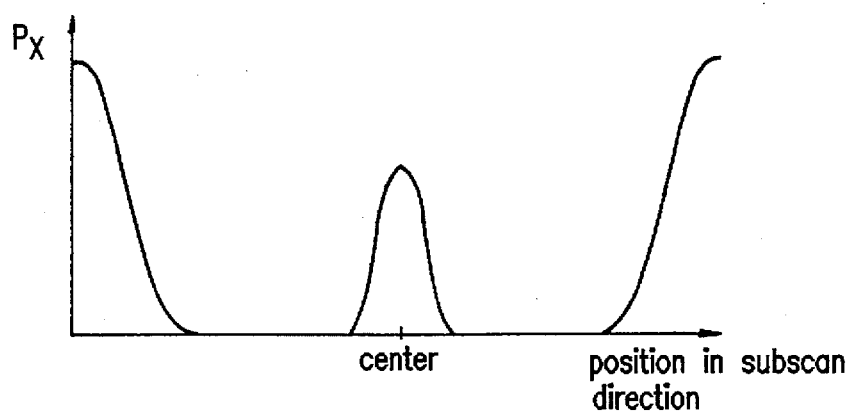

IMAGE READER FOR PROCESSING AN IMAGE OF A DOCUMENT

BACKGROUND OF THE INVENTION

1. Field of the Invention

The present invention relates to the art of detecting the blank areas on the right and left sides of a document and erasing the side surface of a document and the image of fingers holding a document in image readers which read book-like documents and the like by optical scanning.

2. Description of the Related Art

Conventional devices read images from above a document platen upon which is placed a document, such as a book or the like, while using fingers or hands to press both edges of said document so as to prevent the pages of the document from rising upwardly. In such devices, a document is read while an operator presses the blank area of the document so as to not cover information, such as text or photographs in the document, with fingers or hands. The images of the fingers and hands may be included in the image output when reading in the aforesaid manner, thereby disfiguring the output image.

Image readers have been proposed with the object of eliminating the aforesaid disadvantages. One such image reader determines the position of fingers used to hold a document by sensing the image of a document via a color sensor and detecting the flesh colored portions of the fingers via said color information, and then erases the images of the fingers (U.S. Pat. No. 5,377,019).

Another such image reader determines the position of fingers used to hold a document based on the difference in densities of the fingers and the background of the document, and erases the region on the edges at which the fingers are placed (also U.S. Pat. No. 5,377,019). Other image readers determine the position of fingers used to hold a document by sensing the document via a monochrome sensor and determining the difference in luminance between the shadows of the fingers and the document background in the sensed image, and then erasing the image of the fingers.

In image readers which detect the position of fingers by color information and erase the image of the fingers, there is a possibility of erroneous detection due to differences in the flesh color of individual operators. Furthermore, in image readers which determine the position of fingers based on the differences in densities between fingers and the background of a document and then erase the image of the fingers, there is a possibility of erroneous detection of fingers when the fingers and the paper of the document are similar.

When an image reader outputs read image data and the reading speed of the image reader is faster than the output processing speed, image data must be stored in a buffer memory in the reader to eliminate the difference in processing speed. The buffer memory must have a storage capacity sufficient only to store image data in accordance with the difference in processing speeds.

In conventional image readers, however, image data of blank areas which lack information are also stored in buffer memory, which prevents efficient use of the storage capacity of the buffer member.

SUMMARY OF THE INVENTION

A first object of the present invention is to provide an image reader for reading documents having a height such as a book and the like, wherein the images of hands and fingers holding the book can be accurately erased.

A second object of the present invention is to provide an image reader for reading documents having a height such as a book and the like, wherein detection of the position of fingers holding a document and detection of the position of white areas of a document are accurately accomplished, and unnecessary portions of the right and left side surfaces of a book document are precisely erased.

A third object of the present invention is to provide an image reader for reading documents having a height such as a book and the like, wherein the position of the blank areas of a document are recognized from the position of the document subscan direction, the number of picture elements of text in the document, and the luminance of the background in which text is not written, and wherein images, in which the position of blank areas are recognized even when fingers have been placed therein, have the images of said fingers erased by replacement with white data.

A fourth object of the present invention is to provide, in an image reader for reading documents having a height such as books and the like and wherein distortion of an image read in a subscan direction generated by the height of the document is corrected by interpolating lines, the blank area between lines of a document having vertical text and the binding at the center section of a book-like document are detected and designated as section which do not require image correction processing, such that images corresponding to said sections which do not require processing are not stored in buffer memory and line interpolation is used to generate white data, thereby achieving efficient use of the buffer memory.

A fifth object of the present invention is to provide an image reader for reading book-like documents placed on a document platen, said image reader comprising image sensing elements for reading a document, position detection means for detecting the position in the subscan direction of a document read by said image sensing elements, luminance detection means for detecting the degree of background luminance of a document based on luminance data stored in a memory means, counting means for counting as character frequency the number of picture elements of a determined text area based on luminance data stored in a memory means, blank area detection means for detecting luminance blank areas on both right and left sides of a document based on the aforesaid position in the subscan direction, background luminance, and character frequency, and image processing means for erasing images on the exterior side of said blank areas detected by said blank area detection means.

A sixth object of the present invention is to provide an image reader for reading documents having a height such as books and the like, said image reader comprising image sensing elements for reading a document, height detection means for detecting the height of a document, memory means for temporarily storing image data of a document read by said image sensing elements, correction means for correcting by repeated reading of the image data stored in said memory means which are compressed in the subscan direction due to change in the height of the document, position detection means for detecting the position in the subscan direction of a document read by said image sensing elements, luminance detection means for detecting the degree of background luminance of a document based on luminance data stored in a memory means, counting means for counting as character frequency the number of picture elements of a determined text area based on luminance data stored in a memory means, blank area detection means for detecting luminance of blank areas of a document based on the aforesaid document height, position in the subscan direction, background luminance, and number of picture elements of the character area, and blank area correction means for repeatedly outputting and correcting white data without using said memory means when correcting compression in the subscan direction of an image outside a character area detected by said blank area detection means.

These and other objects, advantages and features of the invention will becomes apparent from the following description thereof taken in conjunction with the accompanying drawings which illustrate specific embodiments of the invention.

BRIEF DESCRIPTION OF THE DRAWINGS

FIG. 22 illustrates the membership function expressing the probability of an unnecessary area within a document image relative to the angle of inclination of the document;

FIG. 23 illustrates the membership function expressing the probability of an unnecessary area within a document image relative to the background luminance of the document;

FIG. 24 illustrates the membership function expressing the probability of an unnecessary area within a document image relative to number of character picture elements;

FIG. 25 illustrates the membership function expressing the probability of an unnecessary area within a document image relative to subscan direction position;

In the following description, like parts are designated by like reference numbers throughout the several drawing.

DESCRIPTION OF THE PREFERRED EMBODIMENTS

Figure 1:
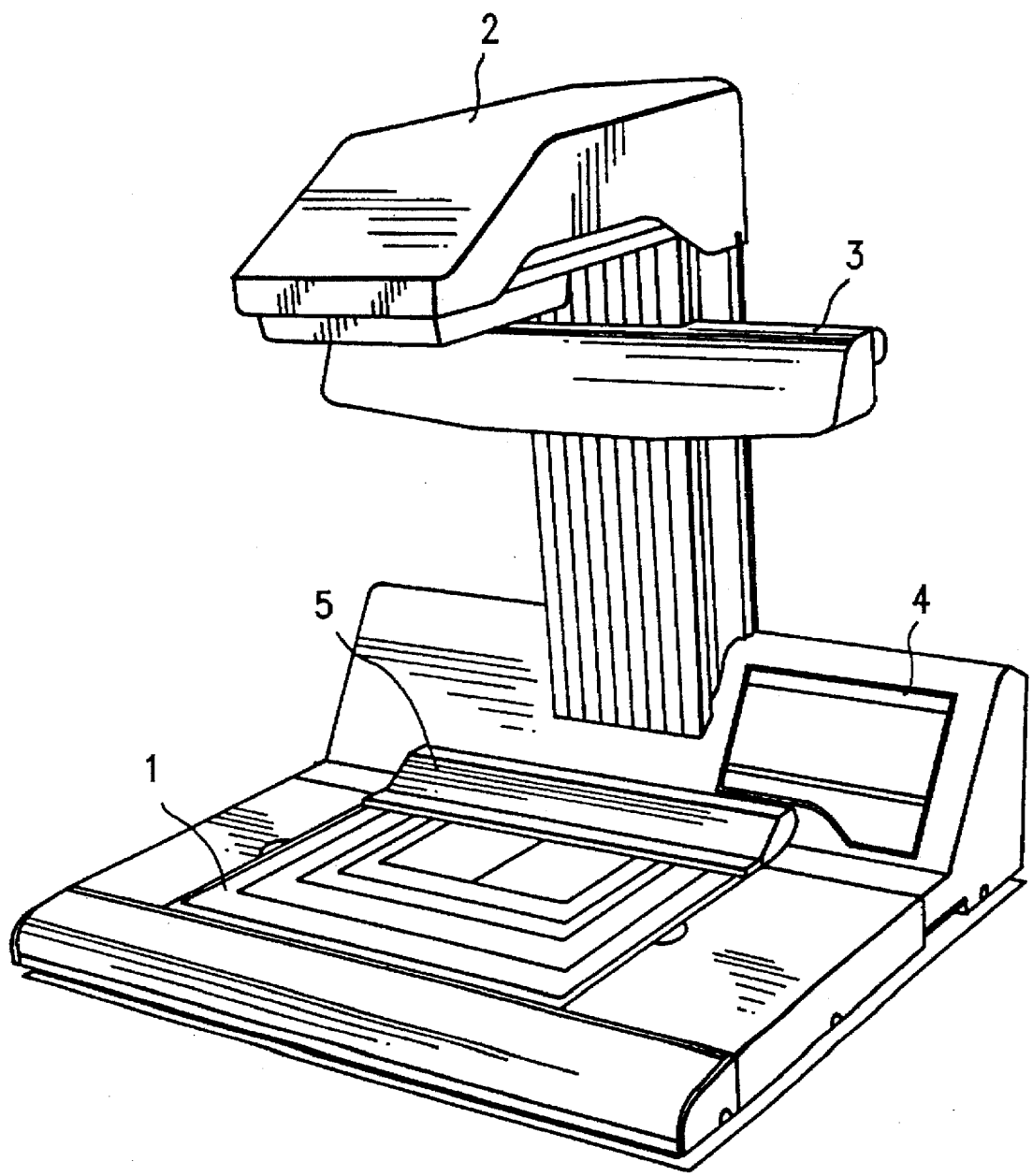
FIG. 1 shows the general construction of an embodiment of the image reader of the present invention.
Figure 2:
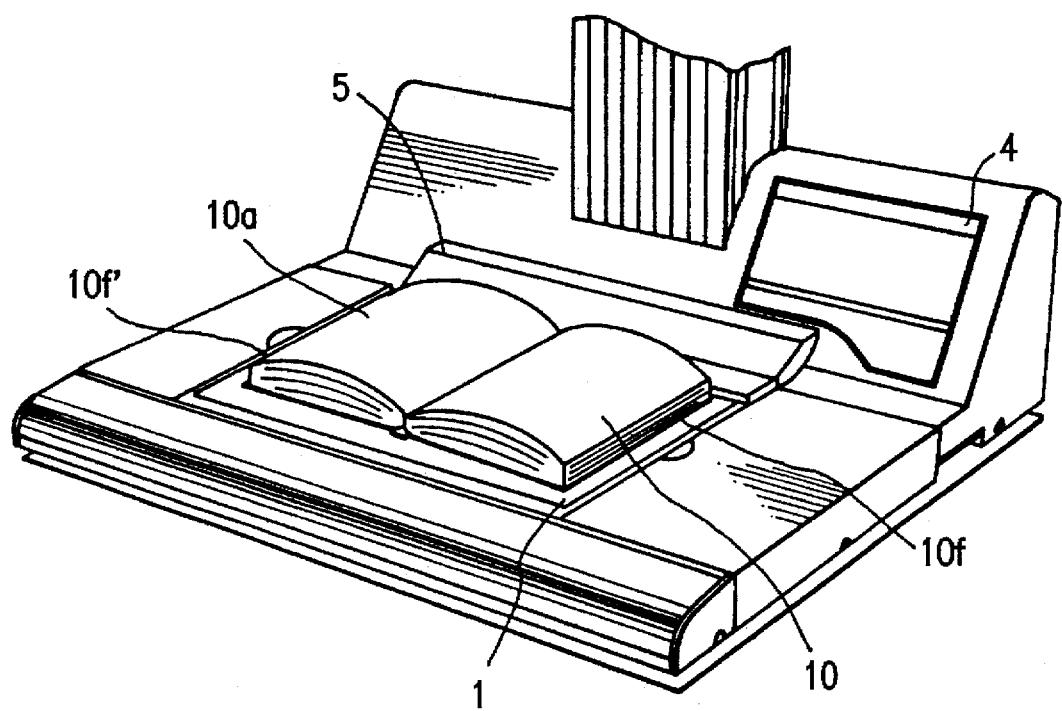
FIG. 2 illustrates the condition of a book document placed on the image reader.

The preferred embodiments of the image reader of the present invention are described hereinafter with reference to the accompanying drawings. FIG. 1 shows the general construction of the image reader; FIG. 2 shows the condition of a book-like document (hereinafter referred to as "book document 10") placed on document platen 1. Book document 10 such as a book, file or the like is placed in an open state facing upwardly on document platen 1, and image sensing device 2 is arranged thereabove and provided with a line sensor for reading the document platen 1 and the open-faced surface of book document 10 and for outputting image data expressing a luminance level of each pixel at every reading position. The document-receiving surface of platen 1 is generally colored darker than the background color of the document, such that the document-receiving surface and the document surface can be differentiated when reading book document 10 with the document-receiving surface as a background. The present device is provided with an illumination section 3, for illuminating book document 10 placed on document platen 1, arranged above said platen 1 on the interior side thereof, operation panel 4 for setting image reading conditions and the like, inclined mirror 5 arranged on the interior side of platen I for reflecting the side surface at the top of book document 10, and a control section (refer to FIG. 20) for controlling image sensing operations such as prescanning, main scanning and the like performed by image sensing device 2 on book document 10. Image data read by image sensing device 2 are subjected to various types of processing by the control section, and are outputted to a desired output device (e.g., printer, computer and the like).

The reference designation of each part of book document 10 placed on document platen 1 shall be defined now. The entire area of pages on both right and left sides of open-faced book document 10 is defined as document surface 10a, the right exterior side surface of book document 10 inclined relative to document surface 10a is defined as document right side surface 10f, and the left exterior side surface is defined as document left side surface 10f'.

Figure 3:
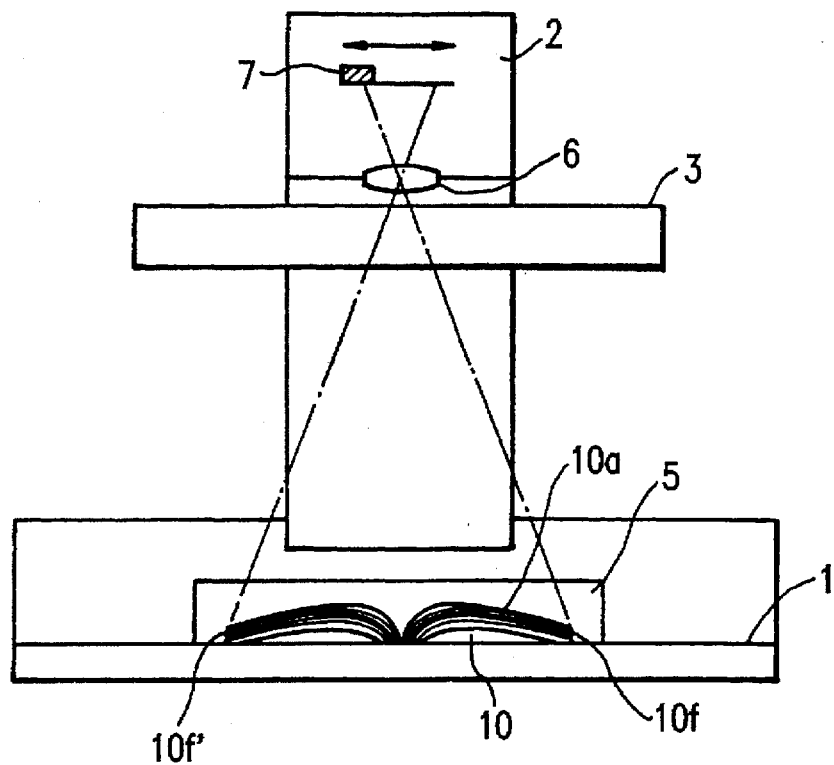
FIG. 3 briefly shows the construction of the image reader viewed from the front.
Figure 4:
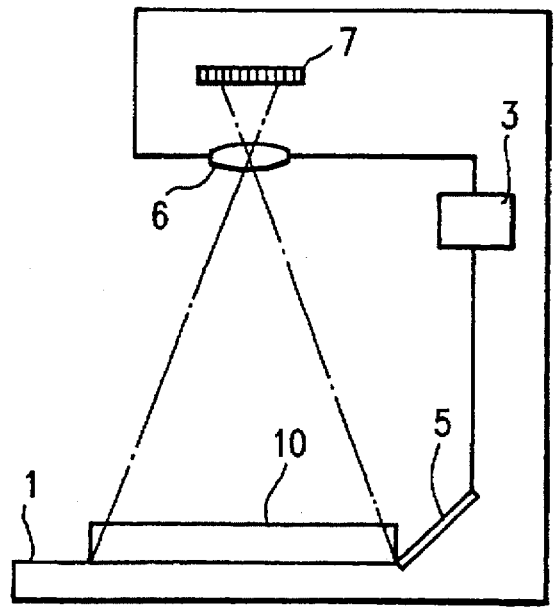
FIG. 4 briefly shows the image reader viewed from the side.

FIGS. 3 and 4 briefly show the construction of the image reader viewed from the front and side, respectively. Image sensing device 2 is provided with charge-coupled device (CCD) line sensor 7 comprising a plurality of image sensing elements arrayed linearly from the front side of the device to the interior side of the device (main scan direction), and an optical unit having imaging lens 6 for projecting the image of document surface 10a on said line sensor. Line sensor 7 reads the image of document surface 10a by moving in a subscan direction perpendicular to the main scan direction (i.e., in the direction indicated by the arrow in FIG. 3) at the image forming plane at which the image of document surface 10a is formed. Imaging lens 6 is provided so as to be movable in the direction of the optical axis by a lens driving device of lens drive unit 32 (refer to FIG. 20), and forms the image of the image of document surface 10a in a normally focused state on line sensor 7 by moving in accordance with the height of book document 10, the height of which is detected in a manner described later. Height detection mirror 5 extends in the subscan direction on the interior side of document platen 1, and is inclined at an angle of 45° relative to the side surface of a document placed on document platen 1, said mirror 5 reflects the top side surface of the book document 10 placed on document platen 1. The top side surface of the document reflected by mirror 5 is projected by lens 6 together with document surface 10a. Line sensor 7 is provided with a length suitable to read only the projected document surface 10a and the image of the top side surface reflected in mirror 5. Line sensor 7 simultaneously reads the images of document surface 10a and the top side surface via scanning movement. Although a line sensor is used in the present embodiment, it is to be noted that an area sensor alternatively may be used.

Document surface 10a of book document 10 forms a curve in the height direction when opened and placed on document platen 1. Thus, the image of document surface 10a is compressed in the subscan direction, the length of the image in the main scan direction is longer at the area having the greatest height and the length of the image is shorter at the area having the shortest height, thereby producing image distortion. Since the distance from image sensing device 2 to document surface 10a changes depending on the height of a document, the focus must be adjusted in accordance with the height of said document. In order to resolve the aforesaid disadvantage, the height of book document 10 is detected at various positions in the subscan direction, and the image distortion is corrected and the focus of the image projected on line sensor 7 is adjusted.

Figure 5:
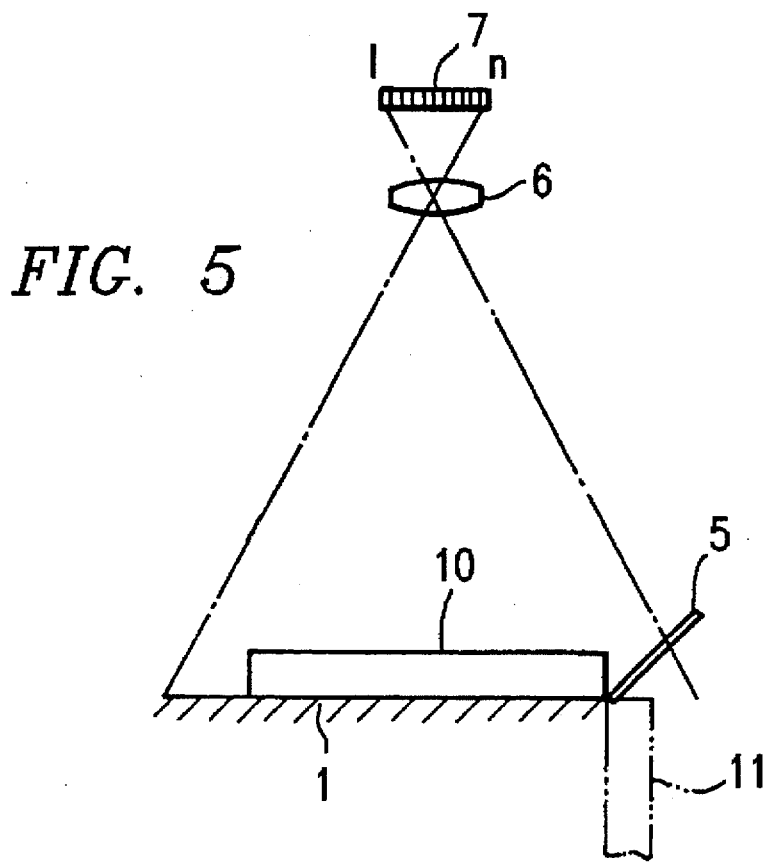
FIG. 5 illustrates the principle of document height detection.

FIG. 5 shows the principle of the height detection process of the present embodiment. Image 11 of the top side surface of book document 10 is reflected in mirror 5, and the height distribution of said book document 10 is determined by line sensor 7 reading image 11 of the top side surface of document 10 reflected in mirror 5.

Figure 6:
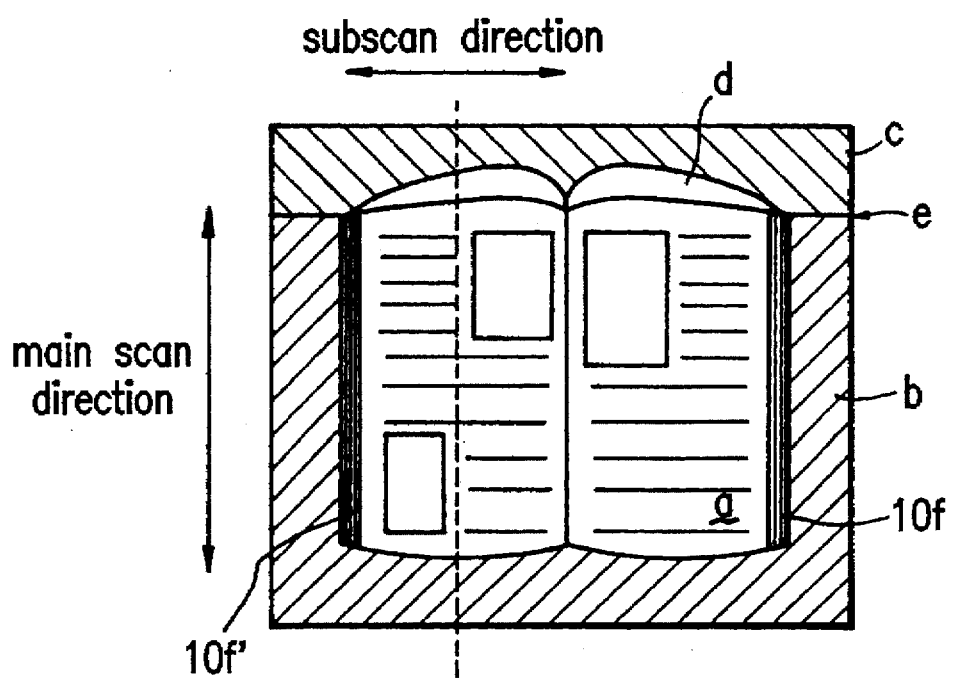
FIG. 6 illustrates the condition of image data read by the image reader.

FIG. 6 shows the condition of image data read by image sensing device 2. In the drawing, reference item a refers to the image of document surface 10a, reference item b refers to the image of document platen 1, reference item c refers to the image of the background reflected in mirror 5, reference item d refers to the image of the top side surface of book document 10 reflected by mirror 5, and reference item e refers to the document positioning reference. Document surface image a and document top side surface image d are read in a curve in the main scan direction by changing the height of the document. The document surface and document top side surface are read as white since white is near the typical color of the paper. In contrast, document platen 1 and image c of the background reflected by mirror 5 are colored darker than the document background so as to produce less reflected light, and are read as black.

Figure 7:
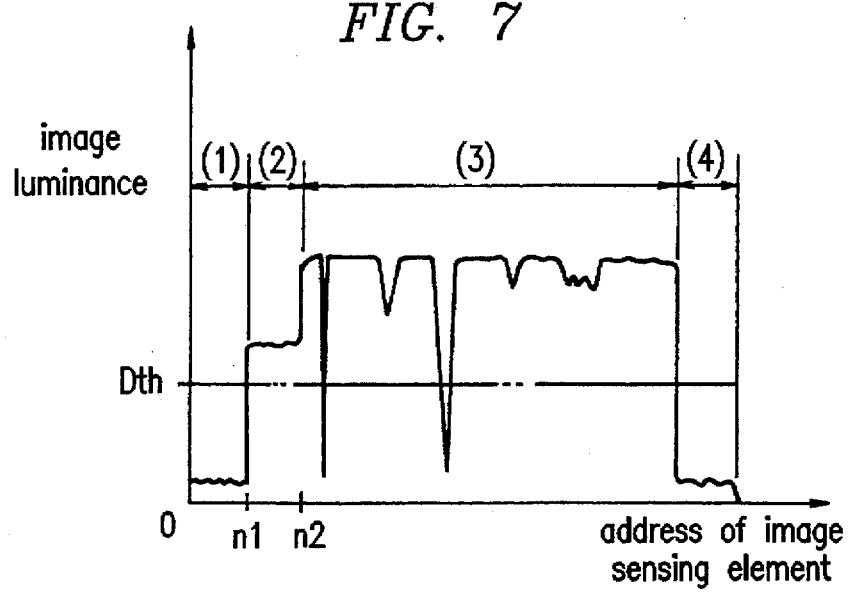
FIG. 7 shows an example of one-line output in the main scan direction read by sensors.

FIG. 7 shows the condition of one-line output in the main scan direction when the image at the position represented by the dashed line in FIG. 6 is read via line sensor 7. The address of the image sensing element of line sensor 7 is indicated on the horizontal axis, and the output (image luminance) of each picture element (pixel) is indicated on the vertical axis. In the drawing, reference number (1) refers to image c of the background area reflected on mirror 5, reference number (2) refers to image d of the document top side surface reflected on mirror 5, reference number (3) refers to image a of document surface 10a, and reference number (4) refers to the region on the imaging element of each picture element of image b of document platen 1. Reference item Dth refers to a predetermined threshold value for determining whether or not an image is an image of a document or another image. Reference item n1 refers to the minimum address value of the imaging element output which exceeds the threshold value Dth, i.e., a value expressing the position at the top edge of image 10a and the document top side surface 11. Reference item n2 refers to the address value of the imaging element corresponding to the document positioning reference e, and is a fixed value. The value of (N2−n1) is the number of picture elements corresponding to the document height used in the height detection process. Document height distribution data (refer to FIG. 10) are determined from the (n2−n1) value of each line. The aforesaid height distribution data are used to calculate the image distortion correction coefficient to correct image distortion caused by changes in document height, and to calculate autofocus (AF) control data to move imaging lens 6 in vertical directions so as to eliminate loss of focus caused by changes in document height.

Figure 10:
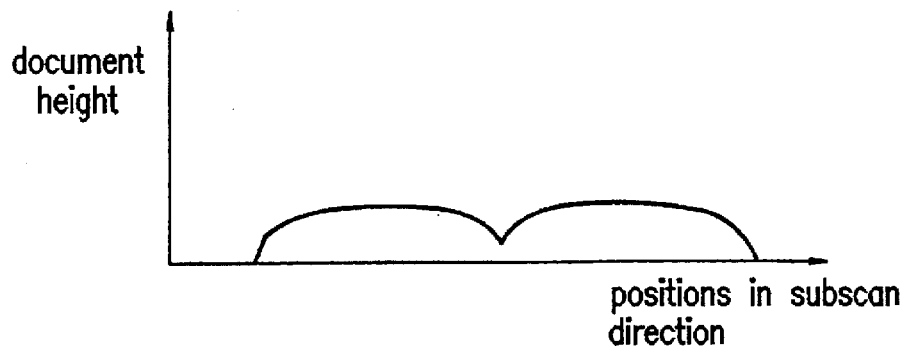
FIG. 10 shows the height distribution data determined by the height detection means.

FIG. 10 shows the document height distribution determined for values (n2−n1) at positions in the entire subscan direction.

Figure 11:
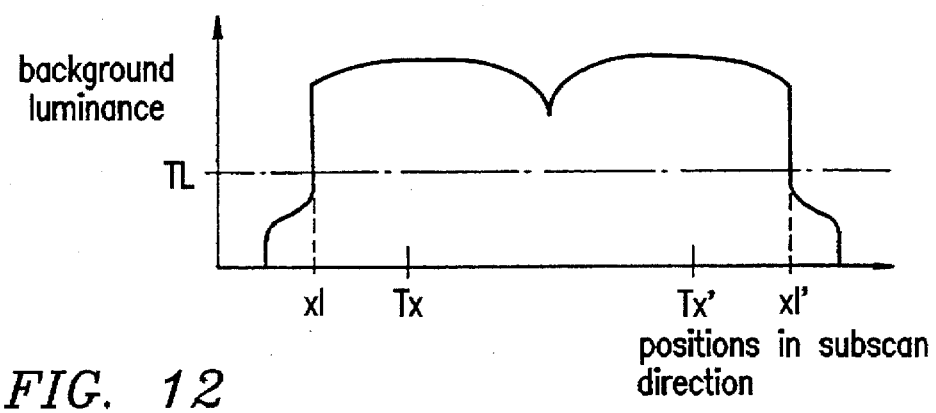
FIG. 11 shows the background luminance distribution determined by the histogram.

In FIG. 11, Tx and Tx' on the horizontal axis represent the highest position of the right and left pages of book document 10. Also in the drawing, x1 and x1' represent the border positions between document surface 10a and the left and right side surfaces 10f and 10f', respectively.

Detection of the number of picture elements of character regions and document background luminance are described below.

Figure 8:
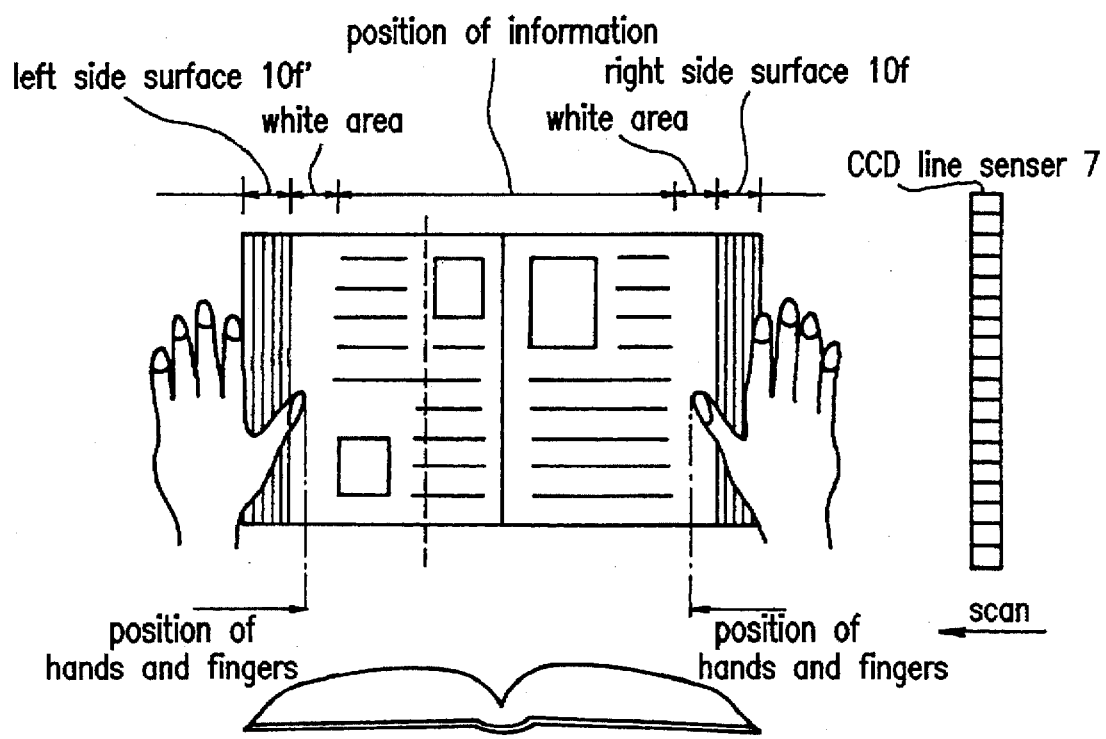
FIG. 8 shows the condition of image data when a finger is placed on a document.

FIG. 8 shows the condition of an image when book document 10 is read by line sensor 7 of image sensing device 2. An operator uses her fingers to hold the portion of book document 10 which does not contain characters (i.e., blank portion) to prevent the pages of document 10 from turning. At least one-line of image data in the main scan direction read by line sensor 7 is temporarily stored in a memory means (buffer memory 29 of FIG. 20). A luminance histogram is created from the aforesaid temporarily stored one-line image data.

Figure 9:
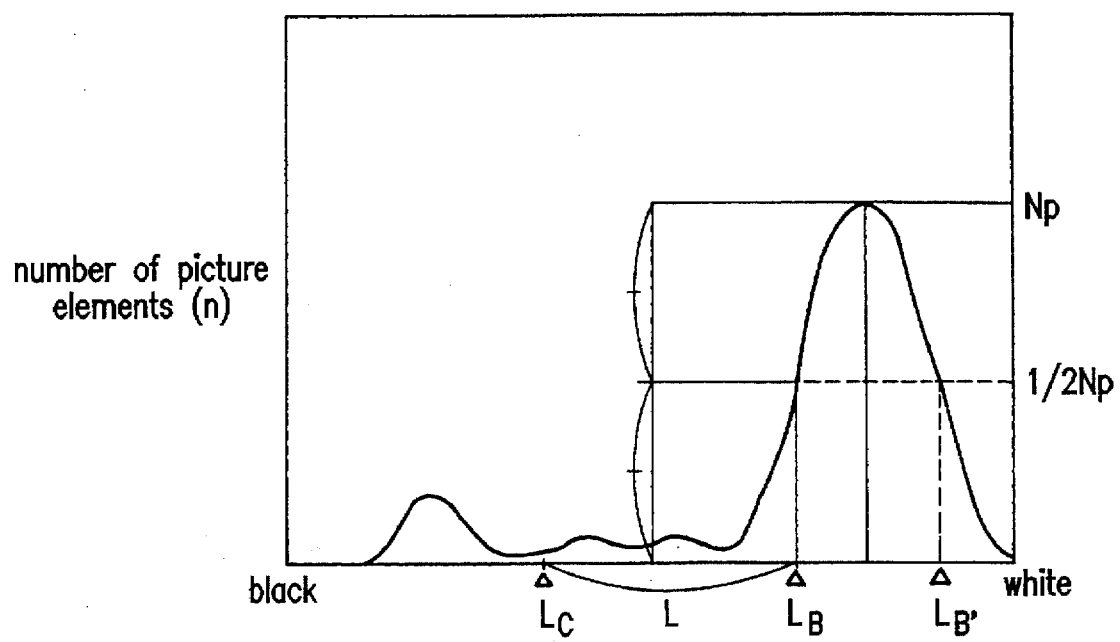
FIG. 9 shows an example of one-line histogram in the main scan direction read by sensors.

FIG. 9 is a luminance histogram created from the one-line image data indicated by the dashed line in FIG. 8. In the drawing, the output (image luminance) of each picture element is represented on the horizontal axis, and the number of picture elements having said luminance is represented on the vertical axis. Document background luminance is defined from the histogram as described below. In one line of the histogram, the number of picture elements (Np) at the peak luminance is determined on the high side, and the luminance value ($L_B$) among luminance values ($L_B$, $L_B'$) corresponding to one half the number of picture elements (½Np) of the peak value is set as the background luminance of that line. The luminance value obtained by subtracting a predetermined value (L) from the background luminance defined per the description above is set as the luminance threshold ($L_C$) for determining a character region.

The methods for determining background luminance and character region determining threshold value are not limited to the previously mentioned methods. For example, the number of picture elements may be counted at the highest luminance, using the luminance value when a predetermined number of picture elements have been counted as the background luminance.

FIG. 11 shows a background luminance distribution determined by creating a luminance histogram for all lines of a document image in a subscan direction for the document of FIG. 8, and determining document background luminance $L_B$. As can be readily understood from FIG. 10, the center area of open-faced book document 10 has a low height, such that the distance between illumination section 3, and image sensing device 2 is longer in that region, and the background luminance has a low value due to the inclination relative to illumination section 3. Similarly, the left and right side surfaces 10f and 10f' of book document 10 also have low values of background luminance for the same reason. Thus, there is a correlation between background luminance distribution and document height, such that the background luminance may be substituted for document height when determining the probability of a blank area (described later).

Figure 12:
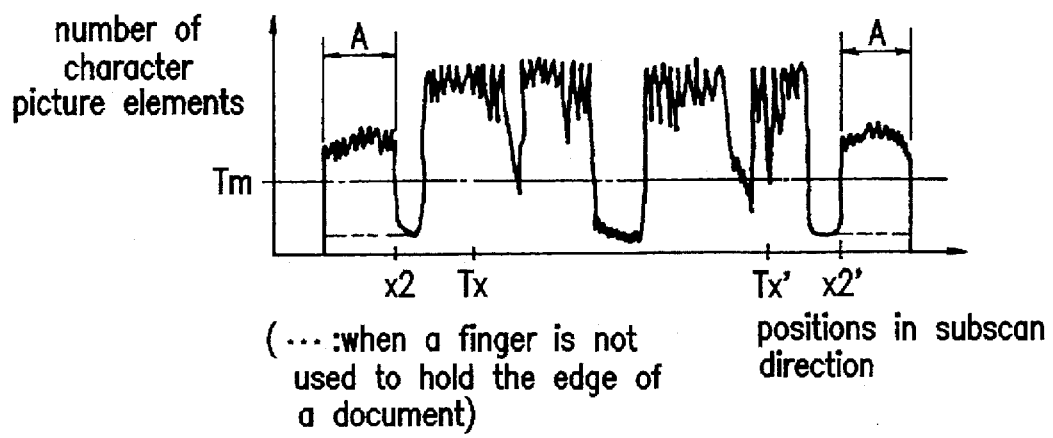
FIG. 12 shows the character picture element number distribution determined by the histogram.

FIG. 12 shows the distribution of the number of picture elements of a character region determined by counting the number of picture elements having a luminance lower than the previously mentioned character region luminance threshold value $L_C$ for all lines of the document image in the subscan direction shown in FIG. 8.

Character picture elements are picture elements having low luminance forming an image of text or photographs within a document. The center region of a document, paragraph breaks, and left and right side blank spaced have high luminance, and a lower number of character picture elements. When a finger is not used to hold the edge of a document, the number of character picture elements is fewer (refer to FIG. 12, dashed line). When a finger is placed on the edge of the document, the finger luminance is counted as character picture elements if said finger luminance is lower than the character area threshold of the edge area (FIG. 12, solid line). Each area A is an area detected to have finger luminance lower than the character area threshold.

Figure 13:
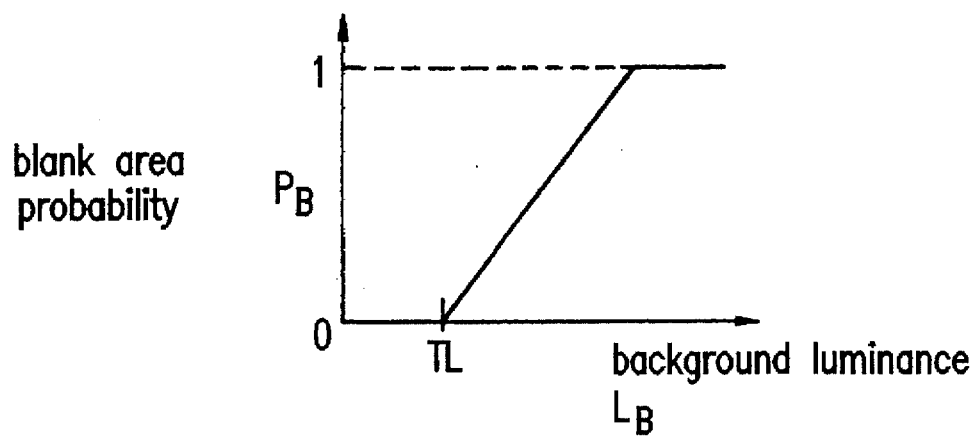
FIG. 13 shows the membership function expressing the blank space probability for erasure relative to document background luminance.
Figure 14:
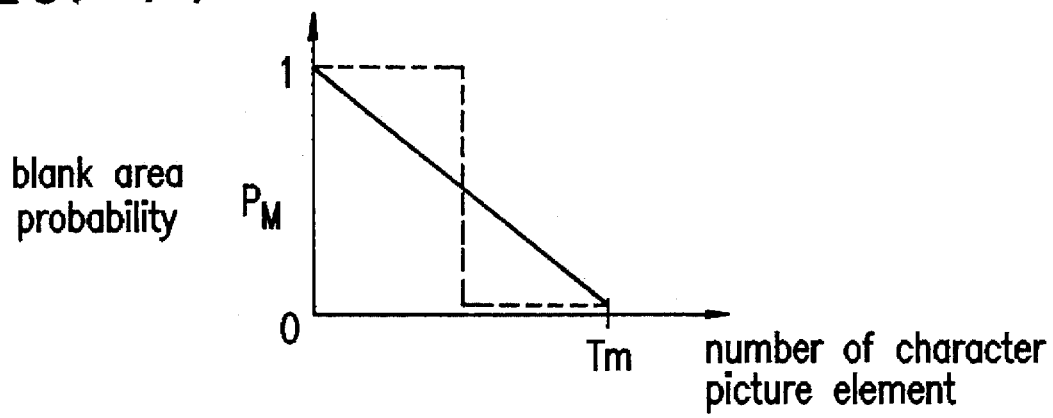
FIG. 14 shows the membership function expressing the blank space probability for erasure relative to the number of character picture elements.
Figure 15:
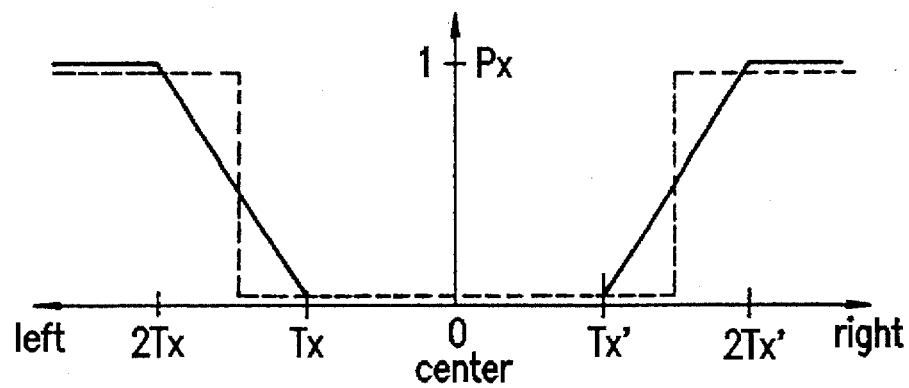
FIG. 15 shows the membership function expressing the blank space probability for erasure relative to the subscan direction position.

FIGS. 13, 14, and 15 show the membership function of the probability of blank area for erasure relative to document background luminance, number of background picture elements, and each value at left and right positions. These functions are stored in a memory means (memory 28) described later. The definition of a blank area is the left and right areas of document surface 10a which do not have characters or photographs or the like. When the probability is high for a blank area to be erased, the value of a membership function approaches [1], and said value approaches [0] when said probability is low.

In FIG. 13, if the document background luminance is less than a predetermined threshold TL, the area is determined to be left and right side surfaces 10f and 10f' on the exterior sides of document surface 10, and since the blank area probability $P_B$ is low, the value is [0]. When the document background luminance is greater than threshold value TL, the blank area probability $P_B$ is high, and the value approaches [1].

In FIG. 14, if the number of character picture elements is greater than a predetermined value Tm, there is a high probability that characters or a photograph or the like is present, such that the blank area probability is low, and conversely if the number of character picture elements is less than said predetermined value, the blank area probability is high. The solid line in the drawing represents the membership function of blank area probability decreasing from [1] to [0] with the number of character picture elements being proportional to an increase from [0] to the threshold value Tm. The dashed line represents the membership functions of blank area probability $P_M$ of [1] when the number of character picture elements is from [0] to Tm/2, and of blank area probability $P_M$ of [0] when the number of character picture elements is greater than Tm/2.

In FIG. 15, the center area of book document 10 has a high probability of being an area of information such as characters or photographs, and the blank area probability $P_X$ is low. As the position moves to the left and right exterior sides from the highest page positions Tx and Tx', the blank area probability Px becomes high. In the drawing, the solid line represents the membership functions wherein blank area probability Px increases from [0] to [1] and left and right side positions are proportional to the positions of highest position Tx to two times position Tx (i.e., 2×Tx)(when Tx is the center position of each page, the position two times Tx (2×Tx) is the page edge, and the probability of blank space at said position 2×Tx is [1]). The dashed line represents the membership functions of blank area probability Px being [1] when the position is Tx×3/2 or greater.

Although the membership functions represented by the solid line are used in the present embodiment, it is to be noted that these membership functions may be suitably set to include other morphologies.

Figure 16:
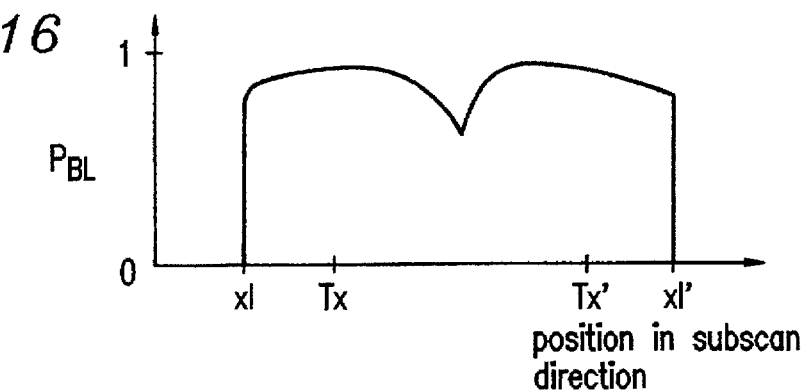
FIG. 16 shows the output values of multiplied membership functions of background luminance distribution.
Figure 17:
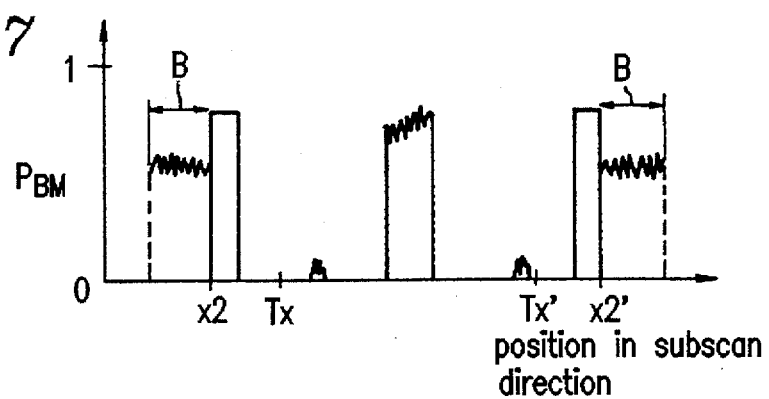
FIG. 17 shows the output values of multiplied membership functions of the number of character picture elements.
Figure 18:
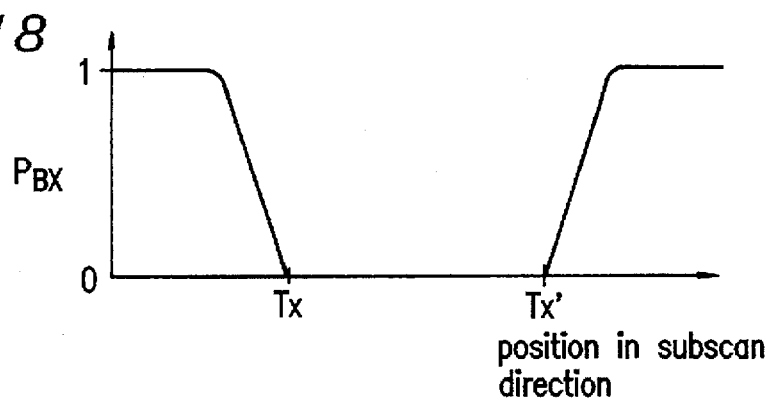
FIG. 18 shows the output values of multiplied membership functions of subscan direction position.
Figure 19:
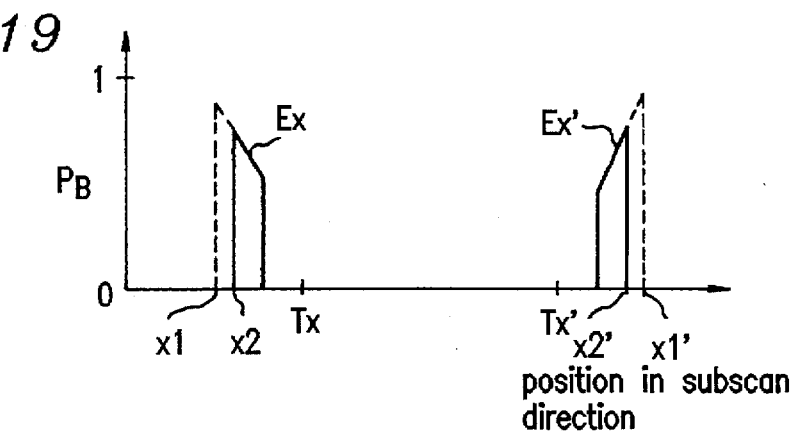
FIG. 19 shows the output value of multiplied output values of FIGS. 16, 17, and 18.

FIG. 16 shows the output values of multiplied membership functions of FIG. 13 in the background luminance distribution of FIG. 11. FIG. 17 shows the output values of multiplied membership functions of FIG. 14. In FIG. 17, each area B is a blank area when fingers are not present. FIG. 18 shows the output values of membership functions of FIG. 15 relative to the document subscan position. In either case, the blank area probability distribution is shown. As shown in FIG. 19, the blank area probability can be determined at each left and right position of the total document by multiplying said three blank area probabilities. The position of highest blank area probability is determined as blank position (Ex, Ex') to be erased, and the image on the exterior side of said position is erased. When fingers are present, the boundary x2, x2' between the side containing the finger and the blank area is set as the erasure boundary, and when a finger is not present, the boundary x1, x1' between the page surface and edge surface is set as the erasure boundary, and the image on the exterior side of said boundary is erased.

Thus, the erasing of image data for a location in a blank area can be achieved based on detected luminance levels and distribution of pixels corresponding to image data statistically likely related to the blank area.

Figure 20:
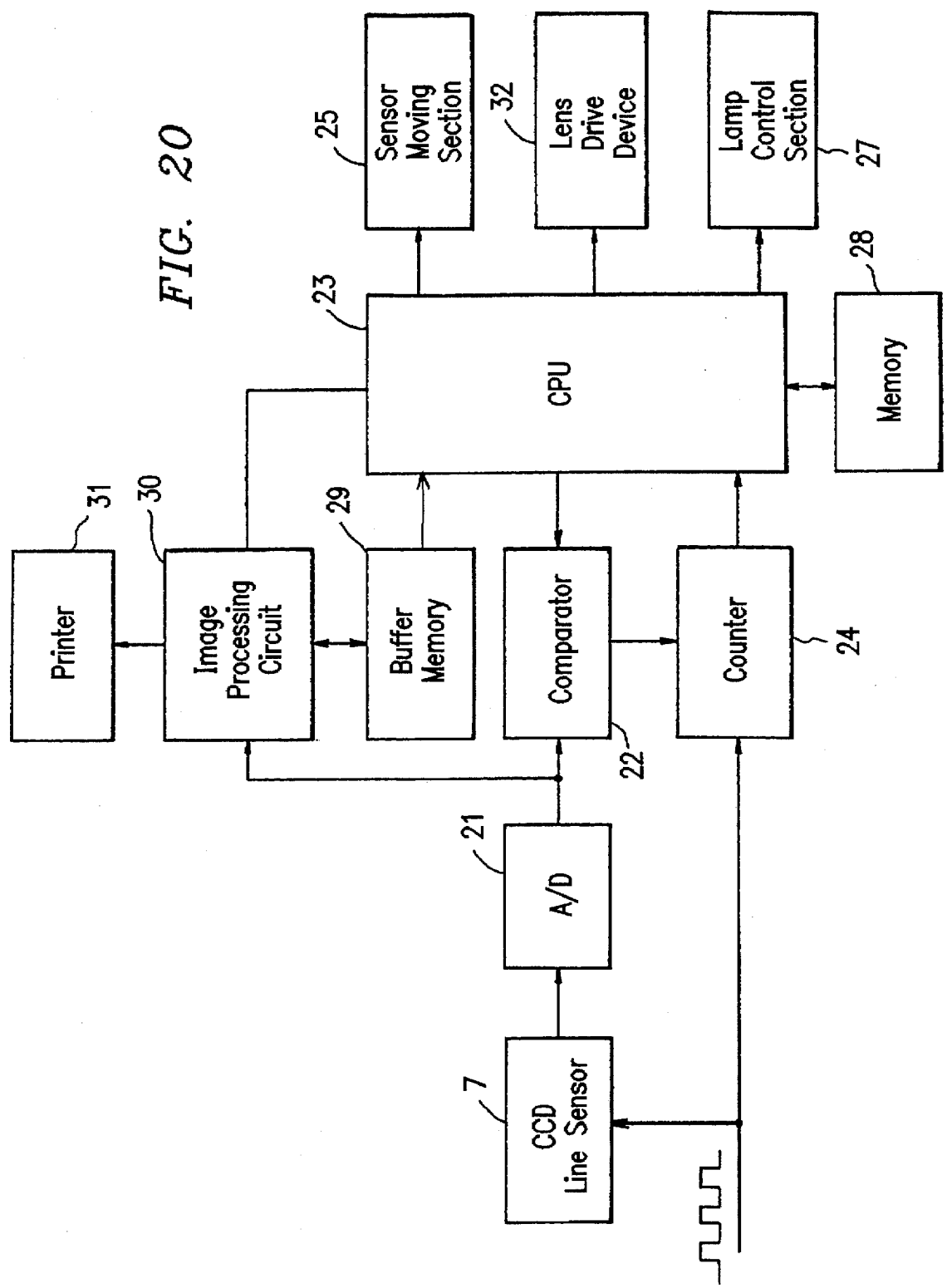
FIG. 20 is a block diagram of the control circuit of the image reader of the present invention.

FIG. 20 is a block diagram showing the construction of the circuits of the control section. In the present embodiment, line sensor 7 executes a prescan operation to detect the height, luminance, and number of character picture elements at each position of book document 10 in the subscan direction before the scanning operation for actually reading the image (main scanning operation). The output of line sensor 7 (image data) obtained by the prescan is subjected to analog-to-digital (A/D) conversion for each line sequentially from the image sensing element of address 1, and said data are thereafter inputted to comparator 22. A threshold value Dth (previously mentioned) is set beforehand in comparator 22 by CPU 23. When image data having a level exceeding the threshold value Dth are inputted to comparator 22, the count value of counter 24 is written to memory 28. Counter 24 counts synchronously with the dot clock connected to line sensor 7, an the count value of counter 24 expresses the address of image data compared by comparator 22. CPU 23 recognizes the minimum value among the count values read from memory 28 as n1 for each line, and stores the n1 value for each line in memory 28. The height of each line of book document 10 is determined by the difference between n2 and the address of reference position at n1.

The output of line sensor 7 obtained by the prescan is subjected to A/D conversion by A/D converter 21, and is thereafter stored in buffer memory 29. Image data stored in buffer memory 29 are transmitted to CPU 23, and a luminance histogram of FIG. 9 is created for each 1-line based on the image data received by CPU 23, and document background luminance $L_B$ and character area threshold value $L_C$ are calculated from said luminance histogram. The calculated background luminance $L_B$ is stored in memory 28.

CPU 23 counts the picture elements wherein the luminance value falls below the character area threshold value $L_C$ for every line via the luminance histogram, and determines the number of character picture elements m contained in 1-line. The number of character picture elements m is stored in memory 28, and the distribution of the number of character picture elements is determined. CPU 23 detects the document position X in the subscan direction currently read by line sensor 7, and this subscan direction position X is stored in memory 28.

Image data of line sensor 7 obtained during prescanning are subjected to A/D conversion by A/D converter 21 sequentially from the image sensing element of address 1, and thereafter are sequentially written to buffer memory 29 which is capable of storing image data for a number of lines. Since the written image data include side surface image data of document 10 as previously described, said side surface image data are eliminated, and only the image data of document surface 10a are sequentially read by image processing circuit 30, subjected to suitable correction processing, and outputted to printer 31 for printing. In image processing circuit 30, image distortion in the main scan direction and subscan direction are corrected based on the count value n1 of each line obtained by the prescan. CPU 23 outputs control signals to lens drive device 32 based on the count value n1 during the main scanning operation, such that the lens 6 moves in accordance with the reading position of line sensor 7, and the image of document surface 10a is normally focused on line sensor 7. CPU 23 determines the blank areas to be erased at the left and right side positions of the document by processing the three data sets of (1) luminance of the background not containing characters or photographs in the document, (2) number of character picture elements comprising character and photograph areas of the document, and (3) subscan direction position, such that an image erasure process is executed by controlling image processing circuit 30 based on the blank area data. The blank area detection means is comprised of CPU 23. CPU 23 also outputs control signals to sensor moving section 25 and to the lamp control section 27 of the illumination section 3.

Figure 21:
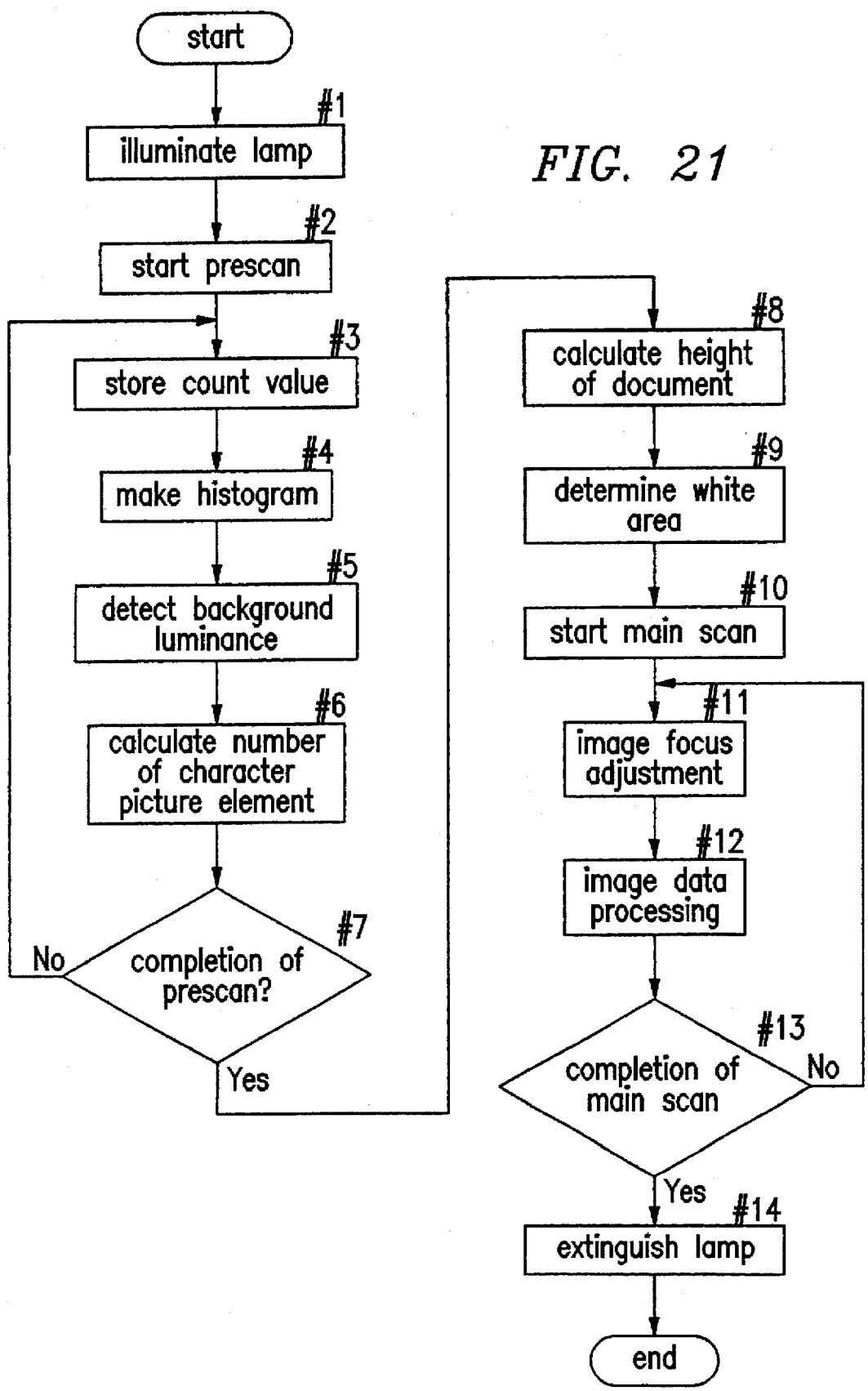
FIG. 21 is a flow chart of the control of the present invention.

FIG. 21 is a flow chart showing the sequence of the reading operation controlled by CPU 23 of the image reader having the previously described construction. When a reading operation start command is inputted from operation panel 4, CPU 23 lights the lamp of the illumination section 3 via lamp control unit 27, and illuminates book document 10 (#1). Then, a prescan start command is issued to sensor moving section 25 (#2), and sampling of count value n1 for each read line is accomplished. This operation reads the document side surface and document surface 10a reflected in mirror 5 as CCD line sensor 7 is moved from one end in the subscan direction, and the count value n1 is stored in memory 28 (#3). Read image data are inputted to buffer memory 29. Image data stored in buffer memory 29 are transmitted to CPU 23, and CPU 23 creates a luminance histogram described in FIG. 9 for each 1-line of data based on the receiving image data (#4). Document background luminance $L_B$ and character area threshold value $L_C$ are calculated from said luminance histogram (#5). CPU 23 counts the number of data having a luminance less than the calculated character threshold value $L_C$ (#6). The aforesaid operations of steps #3–#6 are repeated at uniform periods for all lines, and prescanning ends when all lines have been processed. If prescanning has been completed (#7: YES), distribution data higher than the sampled count values n1 are determined (#8). Then, background luminance $L_B$, number of character picture elements m, and the membership functions shown in FIGS. 13–15 at subscan position X are respectively used to determine blank area probabilities $P_{BL}$, $P_{BM}$, and $P_{BX}$ shown in FIGS. 16–18, and the blank area position is determined from the total blank area probability $P_B$ shown in FIG. 19. Membership functions are stored in memory 28, and calculations are performed until determination of the blank area position is accomplished by CPU 23 (#9). When the aforesaid operations are completed, the main scan start command is issued to sensor moving section 25, and line sensor 7 scans in the reverse direction to the direction of the prescan, and a main scan is executed to read book document 10 (#10). During the main scan, CPU 23 outputs control signals to lens drive unit 32 to adjust the focus of lens 6 (#11), and set the amount of correction in image processing circuit 30 to correct distortion of the picture elements obtained by the main scan based on the height data. At this time, the blank area position determined in step #9 is used to erase the image determined as blank area by control of CPU 23 to prevent output by line sensor 7 (#12). When all lines have been scanned in the main scan (#13: YES), the lamp is turned off (#14), and the image reading operation ends.

In FIG. 15, only the left and right sides of the document have a high blank area probability in the subscan direction, but using another membership function, the blank areas of the binding in the center of the book, and between lines of the document for vertically written characters can be detected. The previous embodiment has been described in terms of erasing detected blank areas from the image data, but the next embodiment is described in relation to a method for correcting image distortion in the subscan direction caused by the height of the document. There are image readers which interpolate image data in line units to correct the compression of an image in the subscan direction due to changes in the height of the document. Such image readers output image data read in the subscan direction line by line to an image outputted device, such that read image data are repeatedly output when image data are interpolated. Document reading continues while said image data are interpolated and repeatedly outputted, the image data read during this time are temporarily stored in a buffer memory provided within the device and outputted when the repeated image data output has been completed. Accordingly, a buffer memory is required which has a capacity of several lines of image data to correct compression of image data in the subscan direction of one document. The amount of correction of compression in the subscan direction is determined by the capacity of the buffer memory. In such image readers, correction of compression of document blank spaces that do not contain characters or photographs is white for each entire 1-line, i.e., line data that contain no image information are temporarily stored in the buffer memory, and when a document having large amounts of blank areas is corrected, line data containing no image information may overflow the buffer memory capacity, such that inadequate correction of the compression in the subscan direction is achieved. The embodiment described below resolved the aforesaid disadvantage.

FIG. 22 is a graph showing the relationship between angle of inclination θ of a document determined from changes in the height of book document 10 and the probability Pθ of the area not requiring image processing in the read image of book document 10. If the angle of inclination is high, there is a high probability that the area is the center binding or and the right and left side surfaces 10f and 10f′, and a high probability that character or photographic information is not written in these areas.

FIG. 23 is a graph showing the relationship between book document background luminance $L_B$ and blank area probability $P_{LB}$. The difference in background luminance $L_B$ of FIG. 13 and blank area probability $P_{LB}$ and the function thereof is that the function of FIG. 13 pertains to areas which do not contain character or photographic information and to blank areas that do not contain information between left and right sides 10f and 10f′ and does not pertain to the blank areas of left and right side surfaces 10f and 10f′, whereas the function of FIG. 23 pertains to blank areas having low luminance of the left and right side surfaces 10f and 10f′ and the center area of the document. Accordingly, in the function of FIG. 23, if the document background luminance is low, the area is considered to be the left side surface 10f′ or the right side surface 10f or the center area of the book document 10, and there is a high probability that character and photographic information are not contained in said area.

FIG. 24 is a graph showing the relationship between the number of character picture elements m in 1-line in the subscan direction of book document 10 and blank area probability Pm. In this case, if the number of character picture elements is low, a high probability of blank space can be determined.

FIG. 25 is a graph showing the relationship between position X in the subscan direction and blank area probability Px. The probability that content is not written becomes higher the closer to the center of the pages, and the probability that there is no content is high at the binding area at the center of the document and at the left and right edges. The functions of FIGS. 23–25 are stored in CPU 23.

Figure 26:
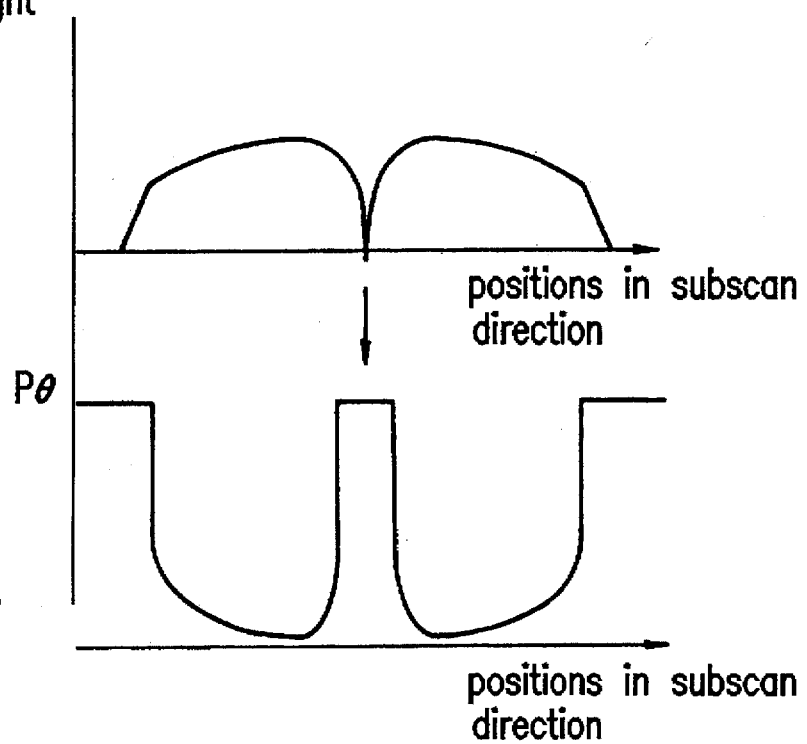
FIG. 26 shows the output value of multiplied membership functions of document height distribution data.

FIG. 26 shows the distribution of blank area probability determined using the function of FIG. 22 with the height distribution of FIG. 10.

Figure 27:
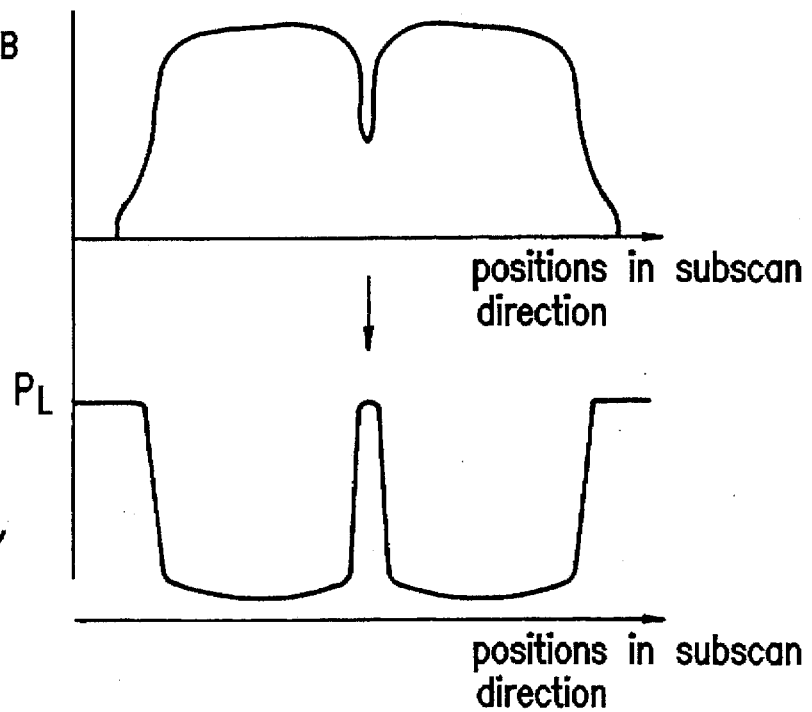
FIG. 27 shows the output value of multiplied membership functions of background luminance distribution data.

FIG. 27 shows the distribution of blank area probability determined using the function of FIG. 23 with the background luminance distribution of FIG. 11.

Figure 28:
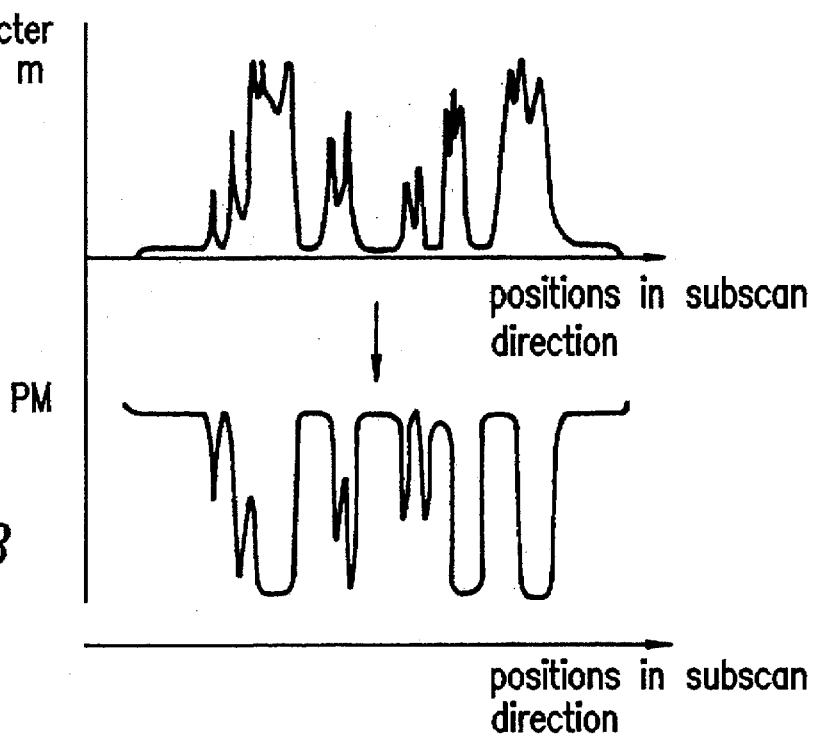
FIG. 28 shows the output value of multiplied membership functions of the number of character picture elements.

FIG. 28 shows the distribution of blank area probability determined using the function of FIG. 24 with the number of character picture element distribution of FIG. 12.

Figure 29:
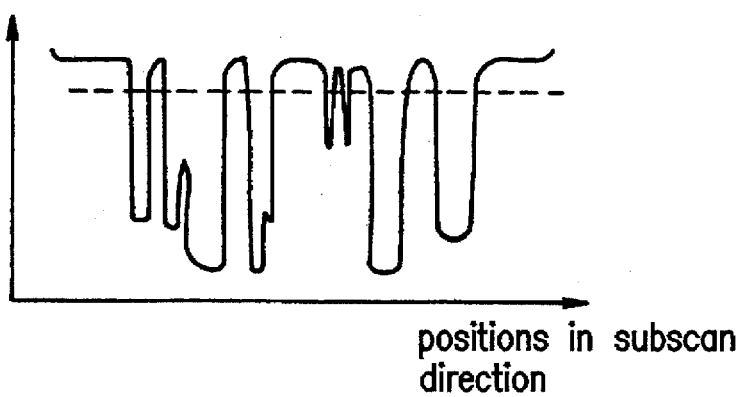
FIG. 29 shows the output value of multiplied output values of FIGS. 26, 27, and 28.

The graph of FIG. 29 results when the blank area probability is determined for each unit of the document by the total probabilities of FIGS. 26–28 and the probability of FIG. 25. The dashed line in FIG. 29 is the threshold value dividing the necessary portion of the document from the blank areas. Since the portion of low blank area probability is necessary to accurately reproduce the image, the image data are sequentially written to buffer memory 29, and image distortion is corrected by repeatedly reading out the image data in accordance with the amount of distortion correction in the subscan direction determined from the document height.

Since the portion of high blank area has a low necessity for accurate reproduction of the image, image data writing to buffer memory 29 is stopped, and image distortion is corrected by repeatedly reading out white data. These white data are outputted from a white data generating section (not shown).

Figure 31:
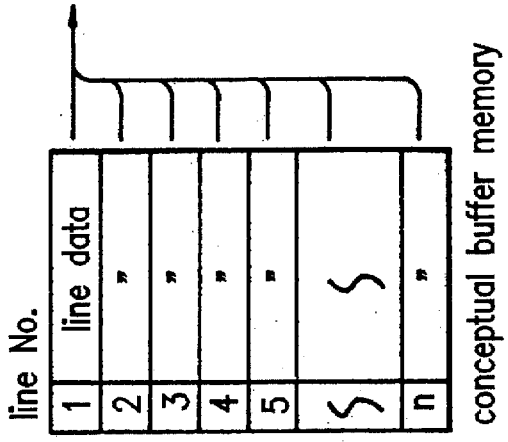
FIG. 31 illustrates an conceptual buffer memory.
Figure 30:
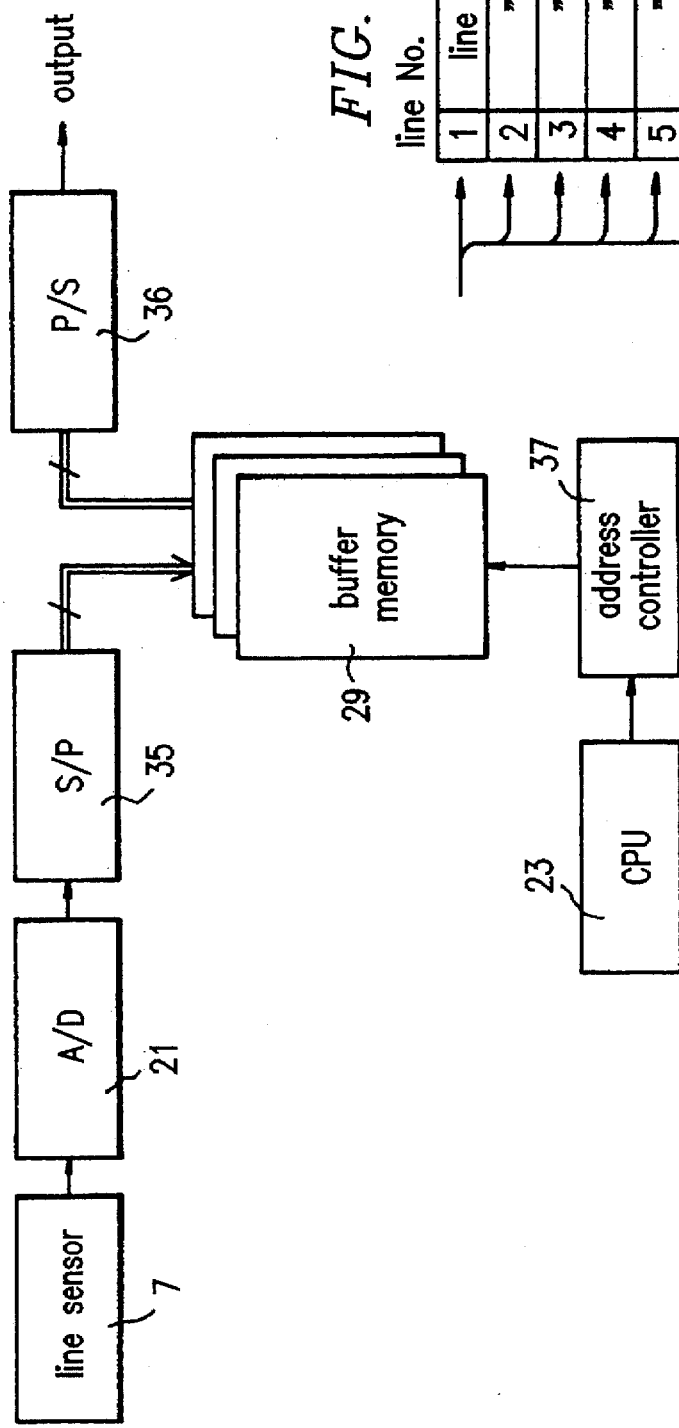
FIG. 30 is a block diagram for realizing image distortion correction.

FIG. 30 is a block diagram for correction of image distortion in the image reader of the present embodiment. The output signal of line sensor 7 is subjected to analog-to-digital (A/D) conversion by A/D converter 21, and thereafter inputted to serial/parallel converter 35, and serial output signals are converted to single blocks of parallel output signals. Image data converted to parallel output signals are written to buffer memory 29 in accordance with instructions from CPU 23 and address controller 37. Written image data is read out from buffer memory 29 simultaneously with a predetermined number of picture elements in accordance with instruction from CPU 23 and address controller 37. Read image data are converted to serial output signals from parallel output signals by parallel/serial converter 36 and transmitted to an image processing device. Buffer memory 29 is described below. Image data transmitted from serial/parallel converter 35 are stored in buffer memory 29 as 1-line units read by line sensor 7. FIG. 31 is a conceptual illustration of buffer memory 29. Buffer memory 29 has a capacity capable of storing only n lines of 1-line units read by line sensor 7. One line (1-line) of image data is stored in one line of the memory chip of buffer memory, a second line of image data is stored in a second line, a third line of image data is stored in a third line and so on; when the final line is stored, the operation returns to the first line and the n+1 line is stored in the first line. Readout of image data from buffer memory 29 is accomplished in 1-line units in the same manner as when storing image data. When correcting distortion of an image in the subscan direction, a command is outputted from CPU 23 to address controller 37 to repeatedly readout the same line from within buffer memory 29. By this method the image in the subscan direction can be expanded, and the image distorted by an inclination of the document surface can be corrected to flatness. The amount of image distortion that can be corrected by the construction of the present embodiment is determined by the total number of lines that can be expanded, and the number of lines is determined by the storage capacity of buffer memory 29. Output switching means (not shown) selectively outputs either white data inputted from white data generating section (not shown), or image data received from buffer memory 29 via commands from CPU 23. In the present embodiment, regarding images having low probability of necessary information, writing of image data to buffer memory 29 is stopped, and image distortion is corrected by selecting and outputting white data from white data generating section (not shown). Accordingly, buffer memory is efficiently used, and greater distortion correction in the subscan direction can be achieved.

The present invention is not limited to the previously described embodiments and may be variously modified. For example, document background luminance information is mainly achieved by detecting the boundary of a document surface and document edge surface, but determination of the boundary of a document surface and document edge surface may alternatively be accomplished using document height inflection points instead of said background luminance. The height distribution of the document surface changes smoothly within the document surface, as shown in FIG. 10, but a discontinuity is produced between the document edge surface and the boundary therewith. Since this boundary area matches the area wherein the background luminance of FIG. 11 is below threshold value TL, a probability distribution of the blank area probability corresponding to FIG. 16 can be obtained by detecting said discontinuous area.

Although the document height measurement methods considered herein include a beam irradiation method disclosed in U.S. Pat. No. 5,084,611, and surface edge method disclosed in U.S. Pat. No. 5,416,609, it is to be understood that the present invention is not particularly limited to such methods.

The present invention as described above provides an image reader for reading a document by optical scanning, and is capable of accurately detecting blank areas by detecting blank areas at the left and right sides of a document from information such as left and right positions of documents, background luminance, and number of character picture elements. The present invention is further capable of preventing determination errors common to conventional devices which detect unnecessary edge surfaces of a document using flesh color data, and also is capable of erasure processing of unnecessary areas of a document at suitable positions.

In addition to the aforesaid blank area erasure, another embodiment of the present invention detects blank areas between lines of a document having vertically written characters and at the binding section at the center of a book document, and effectively uses a buffer memory by correcting an image corresponding to said white data by interpolating white data without using said buffer memory.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reader for reading book-like documents placed on a document platen in a face upward condition, said image reader comprising:
    an image reading device for reading the document platen on which a document is placed and for outputting image data expressing a luminance level of each pixel at every reading position,
    first detection means for detecting luminance levels of pixels corresponding to a background portion of the document at every reading position based on the image data,
    second detection means for detecting distribution of number of pixels corresponding to an image portion of the document based on the luminance level of the image data,
    blank area determining means for determining location of a blank area on a side of the document based on said detected distribution, said luminance levels of pixels corresponding to a background portion, and positions of pixels relating to the document; and
    erasing means for erasing image data of location of the blank area based on detected luminance levels and distribution of pixels corresponding data statistically likely related to the blank area.

2. An image reader according to claim 1, wherein said first detection means generates a histogram representing number of pixels at each luminance level, and detects the background luminance level based on said histogram.

3. An image reader according to claim 1, wherein said second detection means generates a histogram representing number of pixels at each luminance level, and detects the distribution of number of pixels corresponding to an image portion of the document.

4. An image reader according to claim 1, wherein said erasing means erases the image data of location of blank area and the image data on an exterior side of said blank area.

5. An image reader for reading book-like documents placed on a document platen in a face upward condition, said image reader comprising:
    an image reading device for reading the document platen on which a document is placed and for outputting image data expressing a luminance level of each pixel at every reading position,
    first detection means for detecting luminance levels of pixels corresponding to a background portion of the document at every reading position based on the image data,
    second detection means for detecting distribution of number of pixels corresponding to an image portion of the document based on the luminance level of the image data,
    memory means for storing a membership function which defines a relation between the luminance levels of pixels corresponding to the background portion of the document and probability that a portion of the document is blank, for storing a membership function which defines relation between the distribution of number of pixels corresponding to the image portion and probability that a portion of the document is blank, and for storing a membership function which defines a relation between positions of pixels with respect to the document and probability that a portion of the document is blank,
    blank area determining means for determining location of a blank area on a side of the document based on the probability that a portion of the document is blank found by said membership functions; and
    erasing means for erasing image data of location of the blank area based on detected luminance levels and distribution of pixels corresponding to image data statistically related to the blank area.

6. An image reader according to claim 5, wherein said first detection means generates a histogram representing number of pixels at each luminance level, and detects the background luminance level based on said histogram.

7. An image reader according to claim 5, wherein said second detection means generates a histogram representing number of pixels at each luminance level, and detects the distribution of number of pixels corresponding to an image portion of the document.

8. An image reader according to claim 5, wherein said erasing means erases the image data of location of blank area and the image data on an exterior side of said blank area.

9. A method of processing an image of a book-like document placed on a document platen in a face upward condition, the method comprising the steps of:
    reading the document platen on which the document is placed and outputting image data expressing a luminance level of each pixel at every reading position,
    detecting luminance levels of pixels corresponding to a background portion of the document at every reading position based on the image data, detecting distribution of number of pixels corresponding to an image portion of the document based on the luminance level of the image data, determining location of blank area on a side of the document based on said detected distributions, said luminance levels of pixels corresponding to a background portion, and positions of pixels with respect to the document; and erasing image data of location of blank area based on detected luminance levels and distribution of pixels corresponding to image data statistically likely related to the blank area.

10. A method according to claim 9, further comprising the step of:

erasing the image data on an exterior side of said blank area.

11. A method of processing an image of a book-like document placed on a document platen in a face upward condition, the method comprising the steps of:

reading the document platen on which the document is placed and outputting image data expressing a luminance level of each pixel at every reading position, detecting luminance levels of pixels corresponding to a background portion of the document at every reading position based on the image data, detecting distribution of number of pixels corresponding to an image portion of the document based on the luminance level of the image data, finding a probability that a portion of the document is blank by using a membership function stored in memory which defines a relation between the luminance levels of pixels corresponding to the background portion of the document and probability that a portion of the document is blank, finding a probability that a portion of the document is blank by using a membership function which defines a relation between the distribution of number of pixels corresponding to the image portion and probability that a portion of the document is blank, finding a probability that a portion of the document is blank by using a membership function which defines a relation between positions of pixels with respect to the document and probability that a portion of the document is blank, determining location of blank area on a side of the document based on said probabilities that a portion of the document is blank; and erasing image data of location of blank area based on detected luminance levels and distribution of pixels corresponding to image data statistically likely related to the blank area.

12. A method according to claim 11, further comprising the step of:

erasing the image data on an exterior side of said blank area.

13. An image reader for reading documents having a height such as books and the like, said image reader comprising:

an image reading device for reading a document, and for outputting image data, height detection means for detecting the height of a document, memory means temporarily storing the image data of a document outputted by said image reading device, correction means for correcting image data which are compressed in the subscan direction due to change in the height of the document, by repeated outputting of the image data stored in said memory means in accordance with the height of the document detected by said height detection means, blank area detection means for detecting blank area on the document based on detected luminance levels and distribution of pixels corresponding data statistically likely related to the blank area; and blank area correction means for repeatedly outputting and correcting white data without using said memory means when correcting compression of image data of said blank area on the document.

* * * * *

UNITED STATES PATENT AND TRADEMARK OFFICE
CERTIFICATE OF CORRECTION

PATENT NO. : 5,677,776
DATED : October 14, 1997
INVENTOR(S) : Shinya Matsuda, et al.

It is certified that error appears in the above-indentified patent and that said Letters Patent is hereby corrected as shown below:

Column 14, line 46, delete "statistically related" and insert --statistically likely related--.

Signed and Sealed this

Thirtieth Day of June, 1998

Attest:

BRUCE LEHMAN

Attesting Officer

Commissioner of Patents and Trademarks